Figures 4, 5:
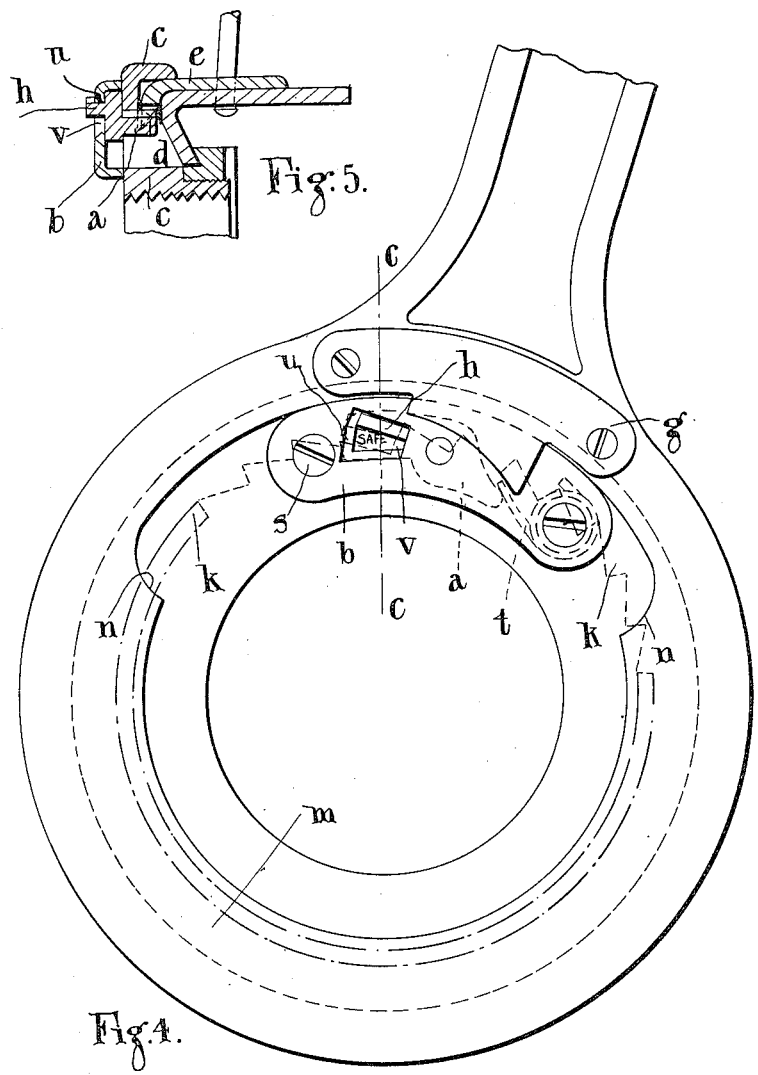

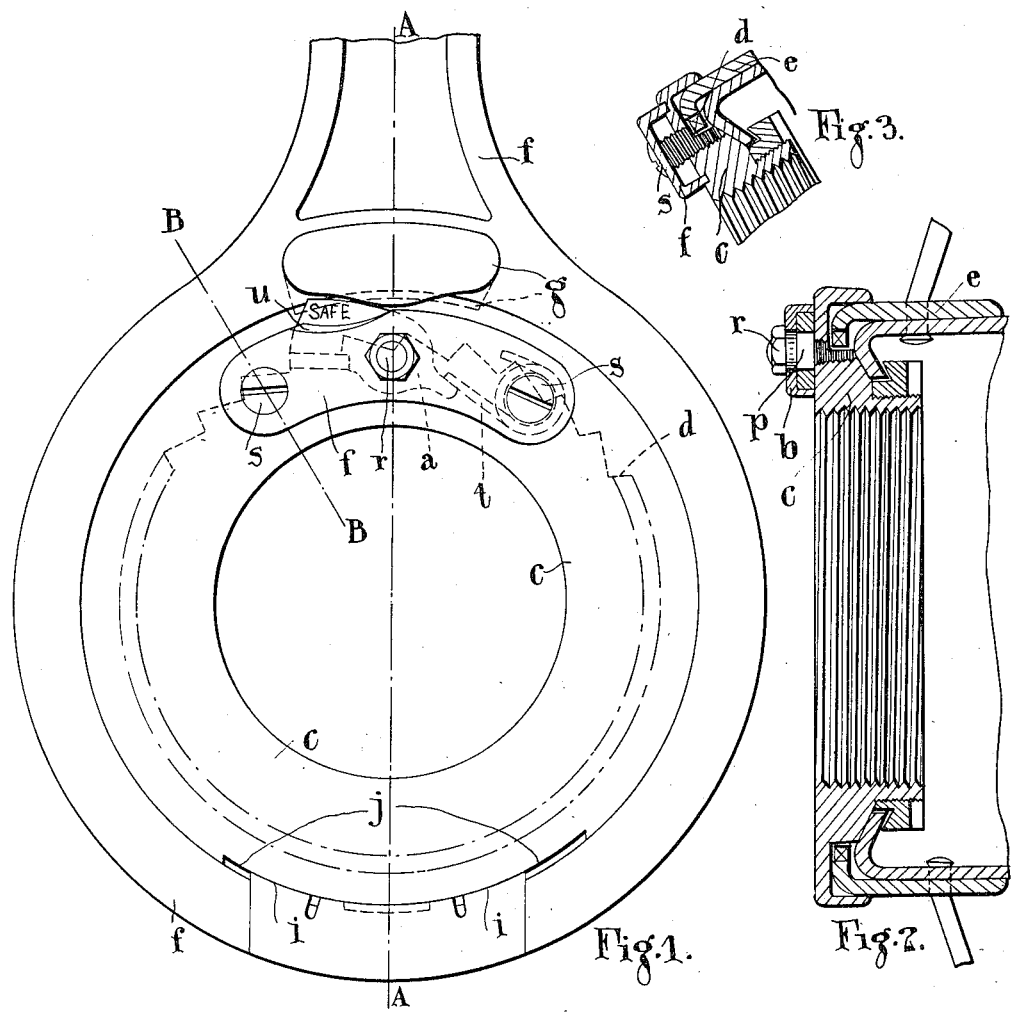

J. V. PUGH.
DETACHABLE WHEEL.
APPLICATION FILED AUG. 26, 1910.

1,031,583.

Patented July 2, 1912.
4 SHEETS—SHEET 2.

Attest.
Benj. M. Stahl
Edward N. Saxton

Inventor
John V. Pugh
by Spear, Middleton, Donaldson & Spear
Attys.

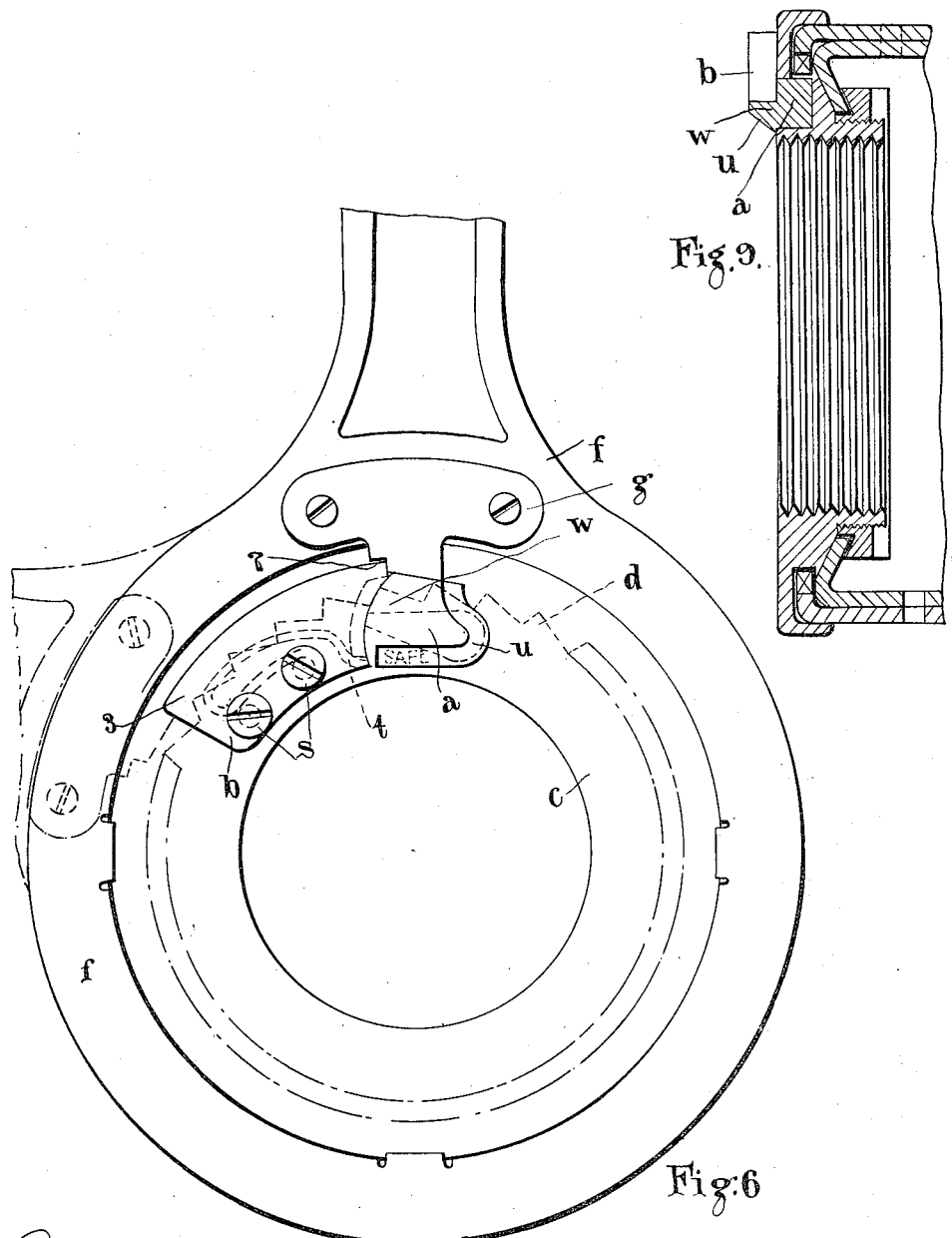

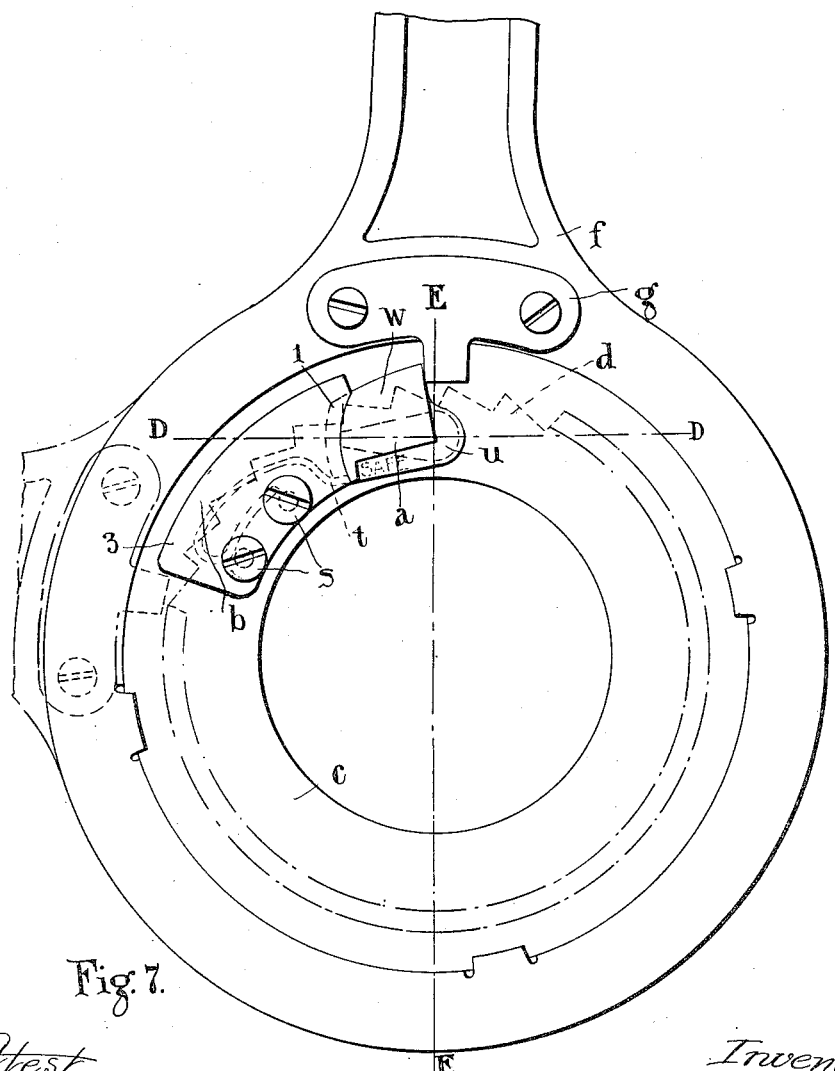

UNITED STATES PATENT OFFICE.

JOHN VERNON PUGH, OF ALLESLEY, ENGLAND.

DETACHABLE WHEEL.

1,031,583.

Specification of Letters Patent.   Patented July 2, 1912.

Application filed August 26, 1910.   Serial No. 579,101.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in and Relating to Detachable Wheels, of which the following is a specification.

This invention relates to detachable wheels of the type in which a detachable hub part is mounted upon a permanent hub part. In such wheels it is usual to hold the outer hub part upon the inner by means of a lock nut or ring provided with a pawl device to prevent the loosening of such lock nut or ring, a suitable spanner being used to screw on or unscrew the lock nut or ring.

Various forms of pawl locking devices and of spanners for removing the lock nut or ring have been proposed before in which the spanner is adapted to depress the pawl when in position for unscrewing the lock nut or ring. These constructions have however necessitated a projection on the spanner being made to engage with a hole in the lock nut or ring or a distinct operation of a movable part of said spanner when in position.

The object of the present invention is to provide improved screwing and locking means which will allow of the spanner being placed on the lock nut or ring at any position between convenient limits without the employment of hole engaging means such as that above referred to in order to simplify the operations involved and reduce the time occupied in fastening or removing a detachable wheel.

The invention consists for this purpose in means for securing detachable wheels, comprising a lock nut or ring, having abutment means, and carrying inclosed pawl locking means on the end thereof, said locking means having an external controlling element, and a spanner having an operating part, projecting over the end of said lock nut or ring, and acting to disengage said pawl locking means before said spanner engages to rotate said nut, when placed thereon, and moved in a direction to disconnect same, said pawl means being free to clatter over the teeth when said nut or ring is screwed up to secure said wheel.

With these and other objects in view, my invention consists in certain novel details of construction, and combination of parts, as will be hereinafter fully described and finally pointed out in the claims.

Referring now to the accompanying drawings: Figures 1, 2 and 3 illustrate one method of carrying the invention into effect, Figs. 2 and 3 being sections on the line A—A and B—B of Fig. 1 respectively. Figs. 4 and 5 show another modification, Fig. 5 being a section on the line C—C of Fig. 4. Figs. 6 to 9 illustrate two further modifications, Figs. 8 and 9 being sections on the lines D—D and E—E respectively of Fig. 7.

In carrying this invention into effect according to the modification shown in Figs. 1 to 3, I place the pawl, $a$, within a box, $b$, on the exterior of a lock ring, $c$, and provide a part as shown dotted in Fig. 1 to project through a hole in the face of the lock ring, $c$, to engage the ratchet teeth $d$, as described in my British specification, No. 18300/1908 but arrange that the pawl shall project above the surface of the box when it is in engagement with the ratchet teeth, $d$, on the end of the outer hub part, $e$. The spanner, $f$, for use with this arrangement of pawl is of the ring type and is provided with flange pieces, $g$, fitting over the front and back of the lock ring, $c$. The spanner, $f$, is also provided as shown with a projection, $i$, which may be formed as a part of the spanner, or as a part removably mounted thereon. A recess, $j$, is provided in the locking ring, $c$, for this projection, $i$, when the spanner is positioned on the ring, $c$. If when in position the spanner is moved in a direction for screwing up the lock ring which in the arrangement shown is clockwise, upon the inner hub part, the left hand part of the projection, $i$, will engage with the end of the recess, $j$, and thus the motion of the spanner will be transmitted to the lock ring, $c$. When the spanner and lock ring are in this relative position the flange piece, $g$, on the front of the face of the spanner will be out of engagement with the pawl $a$, the latter will therefore be free to clatter past the ratchet teeth in the ordinary manner. To unscrew the lock ring the spanner, $f$, is moved in the opposite direction so that the right hand end of the projecting part, $i$, abuts against the other end of the recess, $j$. In this position the projecting part of the pawl, $a$, is depressed by the flange piece, $g$, and the pawl is moved out of engagement with the ratchet teeth, d, the unscrewing of the lock ring, c, is thus permitted.

The length between the abutting faces of the recess, j, in the lock ring and the length of the projecting part, i, of the spanner may be varied to give any desired movement of the spanner upon the ring before the ring is rotated and if desired more than one such recess, j, and projecting part, i, together with a corresponding number of pawl operating pieces, g, may be employed, to increase the range within which the spanner may be positioned upon the ring.

In some cases the front flange piece, g, may be continued as a flange fitting over the entire periphery of the lock ring, c; one or more gaps being cut in this flange to admit the pawl box, b, as will be subsequently described while the pawl is left free or depressed by suitably shaping the contour of the back of the gap. In either of these modifications the pawl, a, and its spring, t, may be pivoted within the inclosing box, b, as described in my British specification No. 18300/1908 or they may be secured in the manner shown in these figures in which the pivot upon which the pawl, a, is mounted consists of a stud, p, screwed into the lock ring, c, and provided with a square, hexagonal, knurled or other non-slipping part engaging with a similar hole in the inclosing box, b, the end of the stud, p, extending from the box, b, being screwed to receive a nut, r, which will thus help to secure the inclosing box, b, in position. Thus should either the screws, s, which secure the inclosing box, b, to the lock ring, c, or the nut r, shake off, the inclosing box, b, will still be held in position. The spring, t, which presses the pawl, a normally into engagement with the ratchet teeth, d, has one end engaging a hole in the lock ring, c, while the other is pressing against the pawl, a. Thus should both the screws, s, and the nut, r, shake off, the pawl will remain in position on its central pivot p, being held there by the knurled, square or hexagon part of this central pivot and kept in engagement with the ratchet teeth, d, by its spring, t, which is itself secured in the hole in the lock ring, c.

In a further modification as shown in Figs. 4 and 5, the pawl, a, is provided with a part, h, projecting through a hole, v, in the face of the inclosing box, b, and this is adapted to be depressed by the flange piece, g, carried by the spanner, f, when the latter is moved in the direction for unscrewing the lock ring, c. A gap, k, is cut in a flange, m, of the spanner, f, to provide abutment faces, n, to bear against the ends of the pawl inclosing box, b, and the distance between these abutting faces, n, determines the length of movement of the spanner, f as explained in connection with the recess j in the previous modification. In this modification the pawl, a, is shown inclosed in a box, b, as described in my British Patent No. 18300/08.

In the modification shown in Fig. 1 a legend for instance—the word "Safe" as shown—may be provided on the end of the pawl, a, which can be seen when the pawl is in engagement with the ratchet teeth, d, and when depressing the pawl to clear these teeth, this legend is hidden. In a modification shown in Fig. 4 the word "Safe" may be placed on the pawl, a, in such a position as to be visible through the hole, v, when the pawl, a, is in engagement and invisible when the pawl is depressed. I may also arrange if desired that when the pawl, a, is depressed another word such as "Free" shall be disclosed to indicate that the pawl is clear of the ratchet teeth, d.

I may further provide means for positively locking the pawl, a, in position when in engagement with the ratchet teeth on the outer hub part. These means may consist of a cotter, split pin or screw passing through the inclosing box, b, and which either passes through a part of the pawl, a, or is adapted to engage with one of its edges, it being only possible to insert such cotter, split pin or screw when the pawl is in engagement with the ratchet teeth, d. I may also arrange that the head or other part of the cotter, split pin or screw shall prevent the spanner, f, from engaging with the lock ring while said cotter, split pin or screw is in position. For instance in the modification shown in Fig. 1, the projecting part, i, of the spanner, f, may be formed with flange portions projecting over the back and front of the lock ring, c; the flange piece, g, shown dotted in this figure as being placed on the back of the spanner being removed and the cotter, split pin or screw used for positively locking the pawl, a, in engagement with the ratchet teeth, d, having a head or part extending over the edge of the lock ring. In placing the spanner in position the lock ring, c, must first be inserted between the flange portions of the projection, i, and the spanner then moved to surround the lock ring which will be seen is rendered impossible while the cotter, split pin or screw above mentioned is in position on account of the part extending over the edge of the lock ring. This can be done, however, after the removal of this cotter, split pin or screw, and in unscrewing the lock ring, c, the pawl, a, is automatically depressed as already explained. In this way I insure that the pawl, a, shall be free to be disengaged from the ratchet teeth, d, before the unscrewing of the lock ring is attempted and damage to the locking means is thereby avoided.

In the modification shown in Figs. 6 to 9 the inclosing box, b, is adapted to contain only the spring, t, which operates the pawl, a. The pawl projects into the interior of the lock ring, c, as shown in Figs. 8 and 9 and is formed integral with or connected to an operating member, w, on the exterior of this lock ring. A channel, x, is cut in one end of the inclosing box, b, so as to form with the lock ring, c, a groove in which a flange, 1, on the external operating member, w, is adapted to slide. To remove the pawl, a, it is only necessary to remove the inclosing box, b, the pawl, a, being withdrawn through the opening in the lock ring, c. All the edges of the pawl, a, are chamfered as shown at u, so as to prevent damage if the pawl is hit except that edge against which a blow would throw the pawl out of engagement with the teeth, d. The spanner for use with this form of pawl locking device carries an operating or flange piece, g, with an inclined lower edge which is adapted in the modification shown in Fig. 6 first to depress the operating member, w, and then to engage with the end, 2, of the inclosing box, b, when the spanner, f, is turned so as to unscrew the lock ring, c, while if the spanner is turned in the opposite direction this operating piece, g, abuts against the opposite end, 3, of the pawl inclosing box, b, and does not therefore operate on the member w. It will be seen that by this construction the operating member w stands in front of the abutment, 2, against which the operating piece, g, of the spanner, f, must press to unscrew the lock ring, c, and the pawl, a, is thus automatically thrown out of engagement before the lock ring can be screwed around.

In the further modification of this device shown in Fig. 7, the pawl, a, itself is made of sufficient strength to form an abutment against which the operating piece, g, of the spanner, f, presses when the spanner is moved in the direction to unscrew the lock ring, c. The engaging surfaces of the pawl, a, and piece, g, are so shaped that the pressure of the spanner operating piece, g, against the pawl, a, moves the latter out of engagement with the ratchet teeth, d, on the outer hub part, e. It will be noted that in this modification there is nothing which can be struck to screw the wheel off except the pawl, a, itself and in striking the pawl it is necessarily thrown out of action. On both these latter modifications the word "Safe" may be marked on the lock ring as shown in such a position as to be visible when the pawl is in its normal position, viz., in engagement with the ratchet teeth, d, and to be hidden by the pawl when the latter is depressed. I may also as already mentioned arrange for another word such as "Free" to be rendered visible by the depression of the pawl, a, so as to indicate when the pawl is out of engagement. Instead of a spanner of the ring type as shown for use with these latter modifications a C spanner may be used. In both of these latter modifications I may also provide positive locking means for the pawl as already described with reference to the former modification. Any other suitable indicating means may be employed, for instance, I may use marks of green and red paint, the green being disclosed when the pawl is in engagement with the ratchet teeth and the red only disclosed when the pawl has been moved free of them.

It will be observed that many modifications may be made in the method of carrying this invention into effect without in any way departing from the spirit of the same.

Having now described my invention what I claim as new and desire to secure by Letters Patent is:—

1. In combination in a device for securing detachable wheels, a nut or screwed member having locking means, and detachable means for rotating said nut which, when applied to the external surface thereof and moved in the direction for unscrewing, first co-acts with said locking means to disengage the same.

2. In combination in a device for securing detachable wheels, a nut or screwed member, teeth fixed relative to the rotation of said nut, a pawl pivoted on said nut, a spring pressing said pawl into engagement with said teeth thus allowing rotation in one direction only and a detachable tool which is applied externally for rotating said nut, which tool when moved in the direction for unscrewing, first co-acts with a part of said pawl to effect disengagement from said teeth.

3. In a device for securing detachable wheels, in combination a nut or screwed member fixed axially but free to rotate relative to the hub of the wheel, ratchet teeth formed internally of the hub, a pawl pivoted on said nut, a spring pressing said pawl into engagement with said teeth so that said pawl will engage with said teeth to prevent unscrewing of the nut but will slip over the teeth when the nut is screwed on, an indicating notice adapted to be disclosed when said pawl is in engagement with said teeth but to be covered when said pawl is not so engaged and detachable means for rotating said nut in either direction which, when placed upon and moved in a direction to unscrew same, first operates to disengage said pawl from said teeth and then to unscrew said nut.

4. In combination with a cylindrical nut or screwed member for securing detachable wheels which is locked against unscrewing, a detachable spanner which, within limits, may be freely applied and rotated upon the external surface of said nut and means upon said spanner which engage and screw up said nut when the spanner is rotated in one direction and which first unlock and then unscrew said nut when the spanner is rotated in the other direction.

5. In a device for securing detachable wheels in combination a nut or screwed member, teeth fixed relative to the rotation of said nut, a pawl pivoted on said nut, a spring pressing said pawl into engagement with said teeth, said pawl and teeth allowing rotation of the nut in one direction only, a detachable spanner which within limits may be freely applied and rotated upon the external surface of said nut, means upon said spanner which engage and screw up said nut when the spanner is rotated in one direction, and means which, when the spanner is rotated in the other direction, first coact with a part of said pawl to effect disengagement from said teeth before the nut is rotated.

6. In a device for securing detachable wheels, in combination a nut or screwed member fixed axially but free to rotate relative to the hub of the wheel, ratchet teeth formed internally of the hub, a pawl pivoted on said nut, a spring pressing said pawl into engagement with said teeth so that said pawl will engage with said teeth to prevent unscrewing of the nut but will slip over the teeth when the nut is screwed on, a legend adapted to be disclosed when said pawl is in engagement with said teeth but to be covered when said pawl is not so engaged, a spanner which within limits may be freely positioned and rotated upon said nut and means upon said spanner which engage and screw up said nut when the spanner is rotated in one direction and which operate to disengage said pawl from said teeth and then to unscrew said nut when the spanner is rotated in the other direction.

7. In a device for securing detachable wheels, in combination a nut or screwed member, means including a pawl engaging with teeth for locking said nut, a detachable ring spanner encircling said nut and capable of a small rotational movement thereon before engaging to turn said nut in either direction and a plate or flange piece on said spanner projecting slightly over the end of said nut whereby when said spanner is rotated upon said nut in a direction to unscrew same said plate engages a part of said pawl and moves said pawl out of engagement with said teeth before said spanner acts to unscrew said nut.

8. In a device for securing detachable wheels, in combination a nut or screwed member, teeth fixed relative to the rotation of said nut, a pawl pivoted on said nut, a spring pressing said pawl into engagement with said teeth, said pawl and teeth allowing rotation of the nut in one direction only, a detachable ring spanner encircling said nut and capable of a small rotational movement thereon before acting to turn said nut in either direction and a plate or flange piece on said spanner projecting slightly over the end of said nut, whereby, when said spanner is rotated upon said nut in a direction to unscrew same, said plate engages a part of said pawl and moves said pawl out of engagement with said teeth before said spanner acts to unscrew said nut.

9. In a device for securing detachable wheels, in combination a nut or screwed member fixed axially but free to rotate relative to the hub of the wheel, ratchet teeth formed internally of the hub, a pawl pivoted on said nut, a spring pressing said pawl into engagement with said teeth so that said pawl will engage with said teeth to prevent unscrewing of the nut but will slip over the teeth when the nut is screwed on, a legend adapted to be disclosed when said pawl is in engagement with said teeth, but to be covered when said pawl is not so engaged, a detachable ring spanner encircling said nut and capable of a small rotational movement thereon before acting to turn said nut in either direction, and a plate or flange piece on said spanner projecting slightly over the end of said nut whereby, when said spanner is rotated upon said nut in a direction to unscrew same, said plate engages a part of said pawl and moves said pawl out of engagement with said teeth before said spanner acts to unscrew said nut.

10. In a device for securing detachable wheels, in combination a nut or screwed member, means including a pawl engaging with teeth for locking said nut a detachable ring spanner encircling said nut, a recessed part on the circumference of said nut, a corresponding projection on said spanner for engaging the ends of said recess to turn said nut but allowing some rotational movement of said spanner before such engagement and a plate or flange piece on said spanner projecting slightly over the end of said nut whereby when said spanner is rotated upon said nut in a direction to unscrew same, said plate engages a part of said pawl and moves said pawl out of engagement with said teeth before said spanner engages said nut to unscrew it.

11. In a device for securing detachable wheels, in combination a cylindrical nut or screwed member fixed axially but free to rotate relative to the hub of the wheel, ratchet teeth formed internally of the hub, a pawl pivoted on said nut, a spring pressing said pawl into engagement with said teeth, a box inclosing said spring and pawl, a detachable ring spanner encircling said nut, a recessed part on the circumference of said nut, a corresponding projection on said spanner for engaging the ends of said recess to turn said nut but allowing some rotational movement of said spanner before such engagement, a plate or flange piece on said spanner projecting over the end of said nut and moving adjacent to the side of said box when said spanner rotates upon said nut, a part of said pawl which, when said pawl is in engagement with said teeth, projecting from the side of said box into the path of said plate and being acted upon thereby to disengage said pawl from said teeth, and a word such as "Safe" upon the projecting part of said pawl, which is in view only when said pawl is in engagement with said teeth.

12. In combination in a device for securing detachable wheels, ratchet teeth and a pawl engaging said teeth to prevent disconnection of said device, said pawl being arranged to display notices indicating its relation to said teeth.

13. In combination in a device for securing detachable wheels, a pawl engaging with ratchet teeth to prevent disconnection of said device, a screwed stud about which said pawl pivots, holding same in position, a spring pressing said pawl into engagement with said teeth and held in position by engagement with a hole in said device, a box covering said pawl and spring connected by screws to said device, a part of said screwed stud projecting through the side of said box and being engaged thereby to prevent rotation of said stud while said box is in position and a thread upon said projection part to receive a nut which prevents the removal of said box.

In testimony whereof, I affix my signature in presence of two witnesses.

JOHN VERNON PUGH.

Witnesses:
FLORENCE SKINNER,
DOROTHY PURNELL.